United States Patent [19]
Owdom

[11] 3,710,930
[45] Jan. 16, 1973

[54] FILTER PACKAGE
[76] Inventor: Maurice R. Owdom, 2201 South Pinkham Road, Visalia, Calif. 93277
[22] Filed: Dec. 21, 1970
[21] Appl. No.: 100,066

[52] U.S. Cl............206/46 FC, 206/46 H, 210/233, 210/238, 220/9 F
[51] Int. Cl. .............................................B01d 27/08
[58] Field of Search......210/233, 234, 238, 240, 251, 210/493, 541, 542, DIG. 17; 206/46 FC, 46 H; 220/9 F

[56] References Cited

UNITED STATES PATENTS 2,337,469  12/1943  Hill......................................210/233

FOREIGN PATENTS OR APPLICATIONS 590,618  7/1947  Great Britain........................210/233

OTHER PUBLICATIONS

Purolator Oil–Air–Fuel Filters Service Manual and Automotive Specifications, 1960, pages 6 and inside back cover relied on.

*Primary Examiner*—John Adee
*Attorney*—Huebner & Worrel

[57] ABSTRACT

An improved package for use in packaging a filter can of a type normally employed in filtering oil circulating through the pressurized system of an automotive engine. The invention is characterized by an elongated support shell including within one end thereof an annular receiver for receiving and supporting an end of a filter can, and a cover shell telescopingly receiving therewithin the support shell and filter can, whereby the filter can is encapsulated in a substantially sealed package. The support shell is configured to include therewithin an oil retention cup circumscribing a piercing unit so that the support shell can be employed as a hand-tool in removing a spent filter can from a heated engine.

1 Claim, 5 Drawing Figures

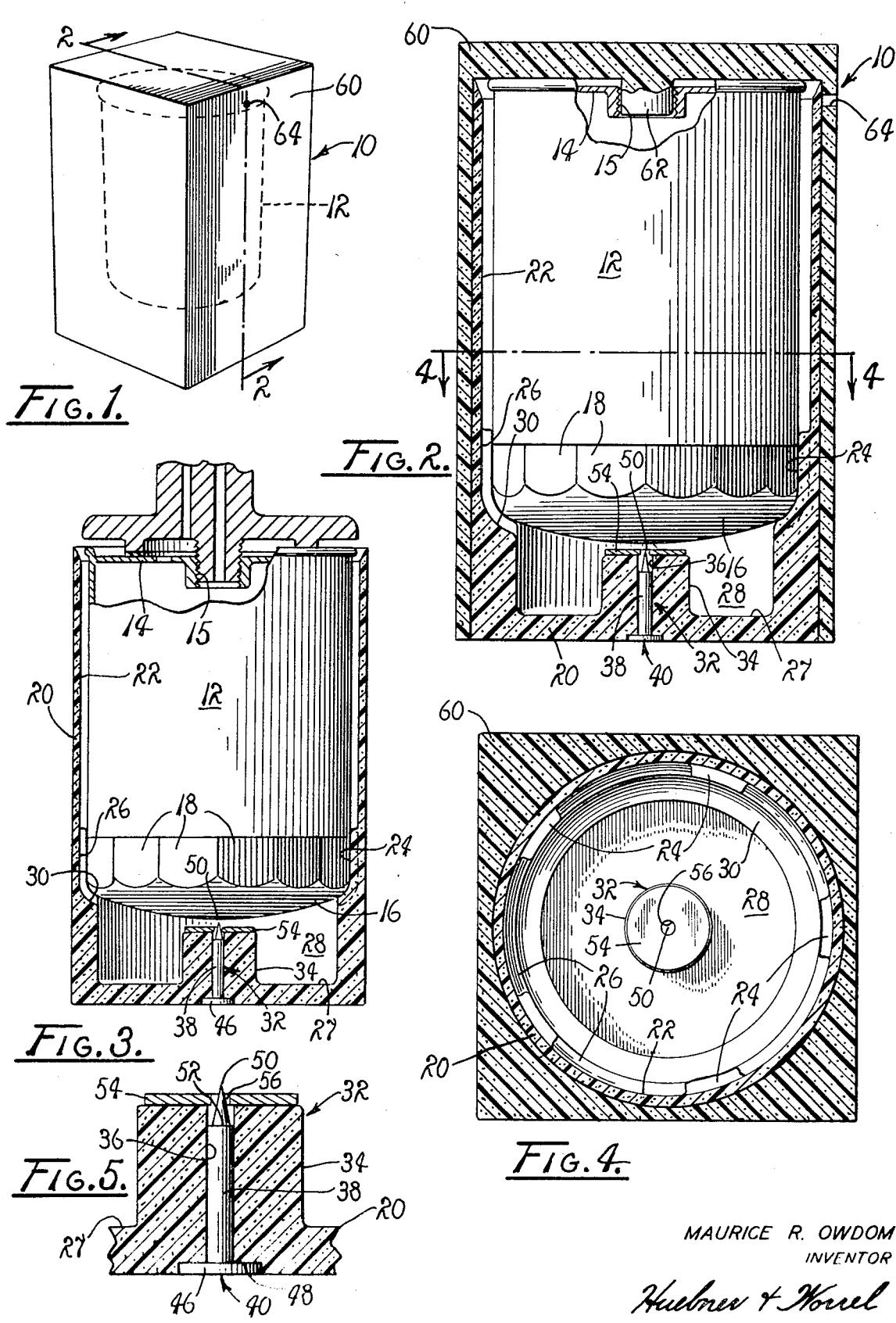

FILTER PACKAGE

BACKGROUND OF THE INVENTION

The invention relates to packages for filter cans of the type normally employed as replacement filters for use in pressurized systems for automotive engines, and more particularly to an improved package particularly suited for use as a package, having utility as a hand-tool in removing a spent filter can, and an encapsulating package for shipping and storing a filter can.

Currently, replacement filter cans often are supplied to automotive service departments, service stations, and the like in individual packages. Normally, the replacement filters are packaged in paper-board containers which are discarded once the supplied replacement filter is removed therefrom.

In removing a spent filter can from association with an automotive engine, it is a common practice to "break" the filter can employing a strap wrench, or similar tool, and then to manually remove the spent filter can by threadingly extracting the filter can from the engine. Frequently, this procedure requires that the automobile be elevated, so that the spent filter can can be encased with "wipe-rags" for purposes of protecting the hands of the serviceman from the effects of hot oil which commonly is discharged from the engine's pressure system as the spent filter can is removed.

Of course, once a spent filter can has been removed, it must be discarded. Presently, the spent filter cans are discarded into bins, barrels and similar receptacles to be transported to a point of disposal. During the handling of the spent filter cans oil often is deposited on the floor of the service area, as well as on the serviceman, and generally tends to contaminate the surrounding area. Once deposited in a discard receptacle, the spent filter can tends to leak so that oil often permeates and thus contaminates the service area.

As is readily appreciated by those engaged in performing automotive services, it is quite desirable that service departments, service stations, and the like be maintained in a substantially sanitary, neat, and orderly condition.

In view of current efforts to protect terrestrial environment, the manner in which spent matter is discarded is of particular importance to those engaged in promulgating protective measures. Hence, the manner in which spent oil filter cans are discarded also is of a particular concern.

Therefore, there currently exists a need for an economically feasible device which can be employed in the handling and storage of filter cans in automotive service departments, service stations, and the like.

OBJECTS AND SUMMARY OF THE INVENTION

It is therefore an object of the instant invention to provide an improved package for use in packaging replacement filter cans.

It is another object to provide an improved package which is economically feasible for use in handling replacement filter cans, and in removing and storing spent filter cans.

Another object is to provide an improved package, for use in packaging replacement filter cans, and which can be employed as a hand-tool in removing a spent filter can from an automotive engine.

It is another object to provide an improved package for use in supplying replacement filter cans and in removing spent filter cans from automotive engines in a substantially clean and sanitary manner.

Another object is to provide an improved package formed of an insulating material and particularly suited for use in handling and storing replacement filter cans, removing spent filter cans from the pressure systems of automotive engines, without subjecting servicemen to injury and contamination, and in storing the removed spent oil cans preparatory to disposal.

These and other objects and advantages of the instant invention are achieved through the use of a package fabricated from expanded cellular polystyrene, including an elongated support shell for receiving therewithin a replacement filter can and having therewithin an oil retention cup, a plurality of lands and grooves for supportingly engaging the distal end of the filter can, a can piercing unit, and a telescoping cover shell for telescopingly receiving therewithin the support shell and the filter can in a manner such that when the package is assembled the filter can is substantially sealed therewithin.

BRIEF DESCRIPTION OF THE DRAWING

FIG. 1 is a perspective view of the improved package which embodies the principles of the instant invention.

FIG. 2 is a sectioned, side elevation, on somewhat of an enlarged scale, taken generally along lines 2—2 of FIG. 1, illustrating a filter can seated within a support shell of the package of FIG. 1 and telescopingly received within a cover shell.

FIG. 3 is a sectioned elevation of the support shell as it operatively is associated with a spent filter can, preparatory to removing the spent filter can from a pressurized oil system of an automotive engine.

FIG. 4 is a cross sectional view taken generally along lines 4—4 of FIG. 2, but with the filter can removed.

FIG. 5 is a fragmented, sectioned view of a piercing unit seated in the support shell depicted in FIGS. 2 through 4.

DESCRIPTION OF THE PREFERRED EMBODIMENT

Referring now to the drawing wherein like reference characters designate like or corresponding parts throughout the several views, there is shown in FIG. 1 an improved package, generally designated 10, which embodies the principles of the instant invention.

As illustrated, the package 10 is of a generally rectangular configuration, however, it should readily be apparent that the package can, where desired, be configured to other shapes, such as a cylinder. For practical purposes, however, a rectangular configuration is deemed desirable.

The package 10 is configured to receive therewithin a filter can 12, FIG. 2, having a base 14 and a distal end 16. The base 14 normally is provided with an internally threaded orifice 15, which is employed in coupling the filter can with the pressurized system of an automotive engine, and a distal end 16 circumscribed by an array of flats 18. These flats, in practice, are employed in threadingly mounting and extracting the filter can from an associated pressurized oil system.

Since the particular filter can to be encapsulated and thus packaged within the package 10 forms no specific part of the instant invention, a detailed description thereof is omitted. However, it is to be understood that the filter can 12 is of a type commonly provided in a "-clean" condition as a replacement filter can to be mounted on an engine and subsequently removed from the engine, once it is "dirty," and discarded as a spent filter can.

The package 10 includes an elongated support shell 20 having an internal wall 22 of a generally cylindrical configuration terminating in an annular array of radially extended lands 24 separated by axially extended grooves 26. The array of lands 24 is located in an axially spaced relationship with the bottom surface, designated 27, of the support shell 20 so that an annular space 28 separates the array 24 from the surface 27. The space 28 communicates with the surface of the wall 22 through the grooves 26 and functions as an oil retainer cup, not designated.

It is important to note that each of the lands 24 is provided with a radially extended shoulder 30 which receives and supportingly engages the adjacent surface of the distal end 16 of the filter can 12. As illustrated, each of the radially extended shoulders 30 is of an arcuate configuration which, in practice, conforms to the curvature of the filter can 12, however, the configuration of the shoulder can be varied to conform to other practical configurations.

Mounted within the support shell 20 is an axially extended piercing unit, generally designated 32. This unit terminates in a coaxially spaced relationship with a filter can 12 seated therewithin. The piercing unit 32 includes a protrusion 34 integrally related with the support shell 20 and extended into the space 28. Preferably, the protrusion 34 terminates in spaced relationship with the plane of the radial shoulders 30.

A bore 36, FIG. 5, extends concentrically through the protrusion 34 and receives therewithin a shaft 38 of a puncture tool, generally designated 40. The shaft 38 is provided with an impact and retainer head 46 seated in a circular depression 48, which concentrically is related to the end portion of the bore 36. In practice, the shaft 38 is provided with a terminal puncture point 50 suitably configured for puncturing the skin of a filter can 12 when operatively advanced into engagement with the adjacent surface of the filter can 12 with a force sufficient to cause the point 50 to engage and penetrate the skin. Preferably, the shaft 38 also is provided with an annular shoulder 52 configured to engage an adjacent face of a stop-washer protrusion which is concentrically related to the point 50 and seated on the innermost end, not designated, of the protrusion 34. The stop-washer 54 provides the shoulder 52 with a surface area increased sufficiently for limiting penetration of the point 50 to a predetermined depth. It is preferred that the stop-washer 54 be fabricated from a thin-gauge sheet metal and include a concentric opening 56 of a diameter adequate for receiving the point 50.

The piercing unit 32 is, in practice, employed in removing a spent filter can from its association with a given automotive engine. Since the support shell 20 is fabricated from expanded cellular polystyrene it is quite flexible. Therefore, the piercing unit 32 can be rendered operative, for puncturing the skin of a spent filter can 12, simply by striking the head 46 a sharp blow with the hammer or similar instrument. Such a blow serves to deform the support shell and advance the point into penetrating engagement with the skin of the filter can being removed. Once the point 50 penetrates the skin of the filter can an opening is formed therewithin. Oil confined within the filter can is permitted to seep through the thus formed opening and be confined within the annular space 28. In this manner, the level of the oil confined within the filter can 12 is reduced sufficiently for precluding spillage from the internally threaded orifice 15 of the base 14, as the filter can is disassociated from the engine. However, in the event a spillage and seepage at the base 14 are encountered, oil is permitted to flow down the external surfaces of the filter can 12, through the grooves 26 and be received within the annular space 28. As illustrated in FIG. 4, the cover shell 20 is of a cylindrical configuration for accommodating a rotation of the shell during the removal of the spent filter can.

The package 10 also is provided with an encapsulating cover shell 60, preferably formed of material quite similar to material from which the support shell 20 is fabricated.

As best illustrated in FIG. 2, the cover shell 60 is provided with an internal diameter closely matching the external diameter of the support shell 20. Hence, a telescoping encapsulation of the filter can 12 is achievable as the support shell 20 is telescopingly inserted into the cover shell 60. Due to the inherent nature of the material from which the cover shell 60 and the support shell 20 are fabricated, as well as the relatively large surface areas established for the external surface of the support shell 20 and the internal surface of the cover shell 60, a substantially fluid-tight seal is achievable for the package. Hence, oil entrapped within the space 28 is confined within the package 10 in a manner such that the package can readily be handled without subjecting one to significant contamination.

Preferably, a concentric protrusion 62 is extended from the internal surface of the end of the cover shell 60 in a manner such that it penetrates the threaded orifice 15 of a filter can 12 seated therewithin. Where the filter can 12 is a "clean" replacement filter can, the protrusion 62, in effect, serves as a supporting member, while in instances where the filter can 12 is a spent filter can, the prtotrustion 62 functions as a "plug" for the orifice, as well as a supporting member for the spent filter can.

The package 10 hereinbefore described is employed in the manner hereinafter set forth.

Once the support shell 20 and the cover shell 60 of the package 10 are fabricated to conform to the hereinbefore desired configuration, a replacement filter can 12 is inserted into the support shell 20. The support shell 20 then is inserted, in a telescoping fashion, into the cover shell 60. The frictional engagement of the internal surface of the cover shell 60 with the external surface of the support shell 20 serves to frictionally "lock" the shells into a unitary package.

The package 10 thus assembled is supplied to servicemen employed in automotive service departments, service stations, and the like.

To employ the support shell 20 in removing a spent filter can 12 from an automotive engine, it is necessary that the package 10 be disassembled and the replacement filter can 12 be removed. Preferably, in removing the spent filter can it initially is loosened through the use of a strap wrench or similar tool which normally is employed to loosen the filter cans to a hand-tight relationship with the engine. The support shell 20 is telescoped about the spent filter can 12 in a manner such that the flats 18 are seated in supporting engagement with the array of lands 24. A sharp blow applied to the head 46 of the puncture tool 40 serves to drive the shaft 38 of the piercing unit 32 toward the spent filter can 12 a distance sufficient for causing the point 50 to penetrate the skin of the filter can. The stop-washer 54 acting against the skin of the filter can 12 and the shoulder 52 of the shaft 38 precludes undesired excessive penetration of the filter can.

Due to the inherent resiliency of expanded cellular polystyrene from which the support shell 20 is fabricated, axial displacement of the shaft 38 readily is accommodated. The resiliency of the material of the support shell also assists in extracting the point 50 from the opening formed thereby so that oil confined within the filter can, normally heated, is permitted to leak into the annular space 28 and be defined therewithin. This leakage of oil tends to preclude spillage through the threaded orifice 15 of the base 14 so that a manipulation of the support shell 20, in an appropriate direction, permits a serviceman to remove the spent filter can 12 from the engine without experiencing contact with the hot oil.

However, in the event oil is discharged from the threaded orifice 15, or from the system with which the filter can 12 is associated, a flow along the external surface of the can is accommodated by the surface of the internal wall 22. As the oil flows along the surface of the internal wall 22, it is permitted to pass between the lands 24, through the grooves 26, into the annular space 28. The filter can 12 now is removed from the engine. The replacement filter can previously confined within the package 10 now is threadingly mounted on the engine and associated with the pressurized oil system.

Once the filter can 12 is disassociated from the automotive engine, the cover shell 60 preferably is telescopingly seated thereover so that the spent filter can is substantially encapsulated within a fluid-tight package 10.

The thus assembled package 10 including the spent filter can 12 can now be deposited for final disposal in an appropriate position such that contamination of the surrounding area is precluded due to the retention of the oil within the package.

Of course, it is to be understood that, if desired, the cover shell 60 can be provided with suitable apertures 64 which preclude a pressurizing of the package 10 as the support shell 20 and the cover shell 60 are telescopingly mated. Furthermore, it is to be understood that while the package 10 is particularly suited for use in confining spent oil filters, the support shell 20 and cover shell 60 and the filter can 12 can be discarded for disposal in a disassociated relationship. In such instances, the utility of the package 10 is somewhat reduced.

In view of the foregoing, it should readily be apparent that through the instant invention, a practical, economical and feasible package for use in supplying, removing, and discarding filter cans for pressurized automotive oil systems is provided.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An improved package for use in packaging an elongated filter can of the type employed in filtering oil circulating through a pressurized system of an automotive engine, including a base having an internally threaded orifice adapted to be coupled with a pressure system and a distal end portion circumscribed by an annular array of external flats, comprising:

A. a support shell formed of expanded cellular polystyrene for receiving therewithin a filter can and having a receiver for receiving and supporting, within the support shell, the distal end of the filter can, said receiver comprising an annular array of a plurality of substantially radially extended lands separated by a plurality of axially extended grooves defining a plurality of oil passageways between the lands, each of said lands being provided with a substantially radially extended shoulder for engaging and axially supporting the distal end of the filter can in a manner such that the filter can is simultaneously supported by said lands against movement in axial and radial directions;

B. a cover shell formed of expanded cellular polystyrene for telescopically receiving said support shell in a substantially fluid-tight engagement and including means for receiving and supporting the base of the filter can;

C. a piercing unit supported in said support shell and coaxially related to a filter can received within said support shell, including a shaft terminating in a point disposed immediately adjacent to the internal surface of the support shell having a concentrically related stop and being supported in a manner such that the piercing unit may be struck for advancing the point into a predetermined penetrated relationship with the received filter can for thereby releasing oil confined therewithin; and D. means defining an oil retention cup axially spaced from the distal end of said filter can, whereby the support shell is adapted to receive oil discharged from the filter can.

* * * * *

UNITED STATES PATENT OFFICE
CERTIFICATE OF CORRECTION

Patent No. 3,710,930　　　　Dated January 16, 1973

Inventor(s) Maurice R. Owdom

It is certified that error appears in the above-identified patent and that said Letters Patent are hereby corrected as shown below:

Column 3, line 53, delete "protrusion" and in lieu insert ---54---.

Signed and sealed this 22nd day of May 1973.

(SEAL)
Attest:

EDWARD M. FLETCHER, JR.
Attesting Officer

ROBERT GOTTSCHALK
Commissioner of Patents